United States Patent [19]

Shu et al.

[11] Patent Number: 5,404,014

[45] Date of Patent: Apr. 4, 1995

[54] INTEGRAL WINDOW/PHOTON BEAM POSITION MONITOR AND BEAM FLUX DETECTORS FOR X-RAY BEAMS

[75] Inventors: Deming Shu, Darien; Tuncer M. Kuzay, Naperville, both of Ill.

[73] Assignee: The University of Chicago, Chicago, Ill.

[21] Appl. No.: 202,502

[22] Filed: Feb. 28, 1994

[51] Int. Cl.6 ............................................. G01T 1/29
[52] U.S. Cl. ............................ 250/336.1; 250/370.10
[58] Field of Search ................. 250/370.10, 336.1, 394

[56] References Cited

U.S. PATENT DOCUMENTS

| | | | |
|---|---|---|---|
| 3,612,858 | 10/1971 | De Parry | 250/336.1 |
| 4,724,321 | 2/1988 | Edlin et al. | 250/336.1 |
| 4,737,643 | 4/1988 | Roberts et al. | 250/336.1 |
| 5,055,686 | 10/1991 | Jones . | |

OTHER PUBLICATIONS

Hofker et al., "A Checker Board Counter: A Semiconductor de/dx Detector with Position Indication", IEEE Transactions on Nuclear Science, Jun. 1966, pp. 208–213.
Dalglish et al., "A Simple Locator for High Energy Beams", Journal of Physics E: Scientific Instruments, 1975, vol. 8, pp. 107–108.
Lamport et al., "A Large Area Circular Position Sensitive Si Detector", Nuclear Instruments & Methods, 134, No. 1, 1976, pp. 71–76.
Anne et al., "Secondary Emission Detector System for Saturne 11", IEEE Transactions on Nuclear Science, vol. NS–24, No. 3, Jun. 1977, pp. 1754–1755.
Diamond Depositions: Science and Technology, "Detection of Ionizing Particles Using Polycrystalline Diamond Films", Dec. 27, 1991, p. 7.
Diamond Depositions: Science and Technology, "Low-Cost Diamond Detector Material for the Superconducting Super Collider", Dec. 27, 1991, p. 7.
Diamond Depositions: Science and Technology, "A Diamond Microstrip Detector", Dec. 27, 1991, p. 8.

Primary Examiner—Constantine Hannaher
Assistant Examiner—Edward J. Glick
Attorney, Agent, or Firm—Mason, Kolehmainen, Rathburn & Wyss

[57] ABSTRACT

A monitor/detector assembly in a synchrotron for either monitoring the position of a photon beam or detecting beam flux may additionally function as a vacuum barrier between the front end and downstream segment of the beamline in the synchrotron. A base flange of the monitor/detector assembly is formed of oxygen free copper with a central opening covered by a window foil that is fused thereon. The window foil is made of man-made materials, such as chemical vapor deposition diamond or cubic boron nitrate and in certain configurations includes a central opening through which the beams are transmitted. Sensors of low atomic number materials, such as aluminum or beryllium, are laid on the window foil. The configuration of the sensors on the window foil may be varied depending on the function to be performed. A contact plate of insulating material, such as aluminum oxide, is secured to the base flange and is thereby clamped against the sensor on the window foil. The sensor is coupled to external electronic signal processing devices via a gold or silver lead printed onto the contact plate and a copper post screw or alternatively via a copper screw and a copper spring that can be inserted through the contact plate and coupled to the sensors. In an alternate embodiment of the monitor/detector assembly, the sensors are sandwiched between the window foil of chemical vapor deposition diamond or cubic boron nitrate and a front foil made of similar material.

23 Claims, 6 Drawing Sheets

TRANSMITTANCE OF PHOTONS IN BERYLLIUM FOILS (p=1.85 g/cc)

FIG. 12

TRANSMITTANCE OF PHOTONS IN DIAMOND FOILS (p=3.5 g/cc)

FIG. 13

TRANSMISSION Be, Al AND DIAMOND

INTEGRAL WINDOW/PHOTON BEAM POSITION MONITOR AND BEAM FLUX DETECTORS FOR X-RAY BEAMS

The United States Government has rights in this invention pursuant to Contract No. W-31-109-ENG-38 between the United States Government and Argonne National Laboratory.

BACKGROUND OF THE INVENTION

1. Field of the Invention

This invention relates to a monitor/detector assembly through which x-ray beams in a synchrotron are transmitted and which is used to either monitor the photon beam position or detect the beam flux for such beams, and more particularly, to a new and improved monitor/detector assembly to monitor the position of the photon beams or to detect the amount of beam flux within the x-ray beams produced in the synchrotron, the monitor/detector assembly having sensors made of low atomic number material, such as aluminum or beryllium mounted on a chemical vapor deposition diamond or cubic boron nitrate foil that also can be a barrier window.

2. Background of the Invention

High energy synchrotron radiation sources are used for research in the fields of endeavor such as the fields of material science, chemistry, physics, medical and biological imaging and geophysics. In a seven (7) GeV Advanced Photon Source (APS), high brilliance and intense synchrotron radiation is generated from insertion devices (IDs). These insertion devices include different types of magnetic wigglers and undulators. It is necessary to monitor the position of the beam so that if it is being missteered, appropriate adjustments can be made. Similarly, the amount of flux within the beam may need to be detected. In certain instances, the front end or ring side of the radiation beam developed by the APS has to be separated from the downstream or working end of the beam. This separation is accomplished through a barrier window that allows the beam to be transmitted through it while at the same time forms a vacuum barrier to separate the ring side of the beam that may be maintained at a superior vacuum level of $10^{-10}$ Torr from the downstream segment of the beam that may be maintained at a lower quality vacuum level of $10^{-8}$ to $10^{-6}$ Torr.

The cross-section of beams being produced in the APS can be visualized as having a core and a surrounding halo. The hard x-ray core of the beam is of a higher energy level than the surrounding halo and therefore can cause extremely high heat loads when it impinges on certain surfaces. On the other hand, the surrounding halo portion of the beam is of a lesser energy level and does not affect as much the surfaces on which it impinges.

In a previously designed arrangement, a photon beam position monitor (PBPM) was used to determine the position of the beam within the synchrotron. The PBPM included a plurality of spaced apart blades, each of which was formed of a chemical vapor deposition (CVD) diamond core coated with a photon sensitive metal, such as tungsten, molybdenum, titanium or a titanium alloy on the order of 1-5 microns thick. Each pair of such spaced apart blades projected in opposite directions towards each other into the path of the beams and based on the amount of energy impinging on the blades, the position of the beam could be determined.

While the positioning of the beam in the APS can be determined by such PBPM's, it would be advantageous to have a monitor/detector assembly that can be readily positioned in the path of the beam without significantly affecting the beams being transmitted through the assembly. Moreover, it would be advantageous to be able to combine in a single unit the functions performed by a barrier window that is used to isolate the front end of the beamline from the downstream end of the beamline and the PBPM. By having a single unit, only one such device needs to be mounted in the path of the beam and the costs associated with producing the devices and mounting them in the synchrotron are minimized. However, the combining of such devices into a single unit cannot be at the expense of the accuracy of the PBPM because it is important to the proper operation and use of the APS to monitor the exact position of the beam so that adjustments can be made if the beam is being missteered.

Accordingly, it is an object of the present invention to provide a new and improved monitor/detector assembly for a synchrotron for monitoring the position of the photon beam or for detecting the amount of flux in the beam.

It is an object of the present invention to provide a new and improved monitor/detector assembly for a synchrotron that functions as a barrier window between the front end and downstream segment of a beamline in the synchrotron as well as enables the monitoring of the position of the photon beam or the detection of the amount of flux in the beam.

It is another object of the present invention to provide a new and improved monitor/detector assembly for a synchrotron that provides the combined functions of a window that serves as a vacuum barrier between the front end or ring side of the beamline and the downstream segment of the beamline in the synchrotron and either a photon beam position monitor that can accurately determine the relative position of the beam within the synchrotron or a beam flux detector that can evaluate the amount of flux within the beam.

It is further object of the present invention to provide a new and improved monitor/detector assembly for use in a synchrotron that combines the functions of a barrier window with a photon beam position monitor or a beam flux detector with the window being formed of a chemical vapor deposition diamond or cubic boron nitrate foil that is fused to a base flange and the position monitor or beam flux detector including sensors of low atomic number material, such as aluminum or beryllium, that are disposed on the window foil.

A still further object of the present invention is to provide a new and improved monitor/detector assembly for use in a synchrotron that combines a barrier window with a photon beam position monitor or beam flux detector with sensors of low atomic number material, such as aluminum or beryllium, being sandwiched in between the window formed of a chemical vapor deposition diamond or cubic boron nitrate foil and a front foil of similar material.

SUMMARY OF THE INVENTION

In accordance with these and many other objects of the present invention, the present invention is embodied in a monitor/detector assembly for use in a synchrotron, the monitor/detector assembly functioning either as a photon beam position monitor or a beam flux detector and in certain instances additionally as a vacuum barrier between the front end and downstream segment of the beamline in the synchrotron. The synchrotron produces x-ray beams having a high energy level hard core and a lower energy level halo or outer area. A base flange is positioned in the path of the beam in the synchrotron. The flange may be formed of oxygen free copper and has a central opening covered by a window foil that is fused onto the base flange. The window foil is made of man-made materials, such as CVD diamond or cubic boron nitride. Sensors made of low atomic number materials, such as aluminum or beryllium, are laid on the window foil in a manner similar to the circuits on a printed circuit board. The low atomic number sensors tend to absorb softer x-rays in the halo portion of the beam, but are virtually transparent to medium to high spectra photons found in the core of the beam. Consequently, the sensors do not interfere with the performance of the window either thermally or mechanically. Nevertheless, the chosen low atomic number sensors are sufficiently good photo-electron emitters that the sensors generate a sufficient amount of electrons that can be measured and analyzed to determine information about the beam in the synchrotron. The configuration of the sensors on the window foil may be varied depending on the function being performed. For example, sensor strips may be laid horizontally and/or vertically on the window foil so that the relative position of the beam can be determined. Alternatively, the window foil can be coated with sensor material so that the monitor/detector assembly functions as a detector for the amount of flux present in the beam.

A contact plate of insulating material, such as aluminum oxide, has an opening corresponding to the opening in the base flange and is secured to the base flange such that it is clamped against the sensor strips on the window foil. In order to couple the sensors to external electronic signal processing devices, gold or silver leads may be printed onto the contact plate. The leads are coupled to the sensors and to a screw post for coupling to the electronic signal processing devices. Alternatively, the sensors can be coupled to the electronic signal processing devices via a copper screw post and a copper spring that can be inserted through the contact plate and coupled to the sensors.

In certain instances, the window foil is used as a barrier between the front end of the beamline and the downstream end of the beamline. In such instances, the window foil is a solid foil across the opening in the base flange. On the other hand, the window foil may have a central oval, circular or rectangular opening that permits the beam to be transmitted through the monitor/detector assembly without any distortion or the like.

In an alternate embodiment of the present invention, the sensors are sandwiched between the window foil of CVD diamond or cubic boron nitride and a front foil made of similar material. The front foil aids in providing electric insulation and structural stability to the combined window and monitor. Moreover, the thickness of the front foil can be varied to control the spectral range of the photons that are absorbed and hence to control the type of photons that create signals in the sensors. As a result, the position of the beam can be determined based on a predetermined level of photons impinging on the sensors.

BRIEF DESCRIPTION OF THE DRAWINGS

These and many other objects and advantages of the present invention will become readily apparent from consideration of the following detailed description of the embodiments of the invention shown in the accompanying drawings wherein.

DETAILED DESCRIPTION OF THE PREFERRED EMBODIMENTS

Figure 1:
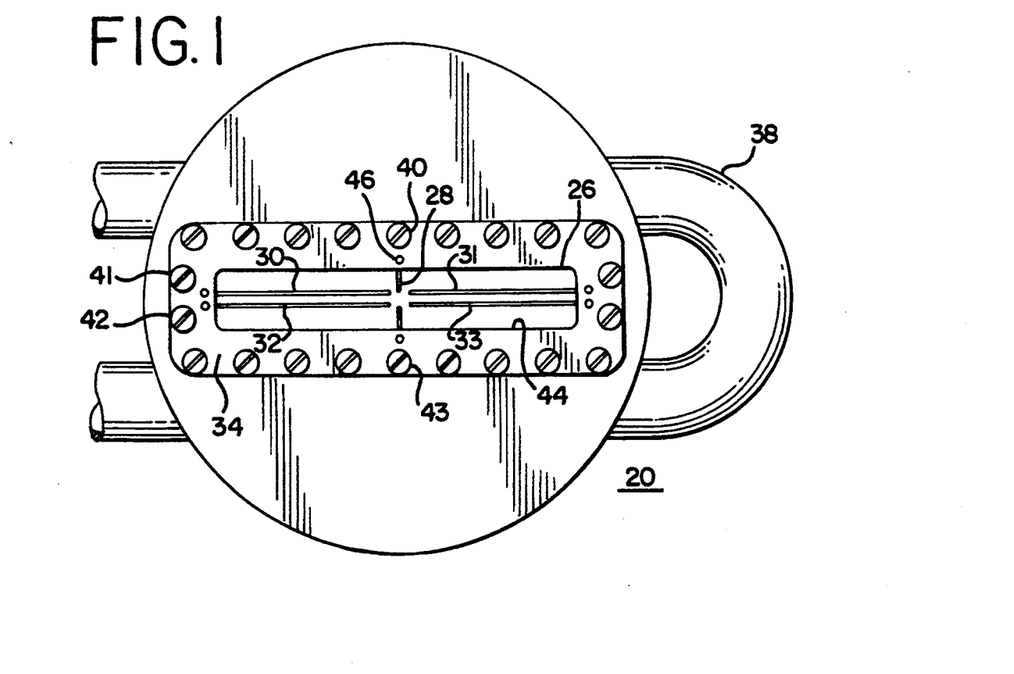
FIG. 1 is a simplified side elevational view, illustrating a monitor/detector assembly for a synchrotron which monitor/detector assembly embodies the present invention.
Figure 2:
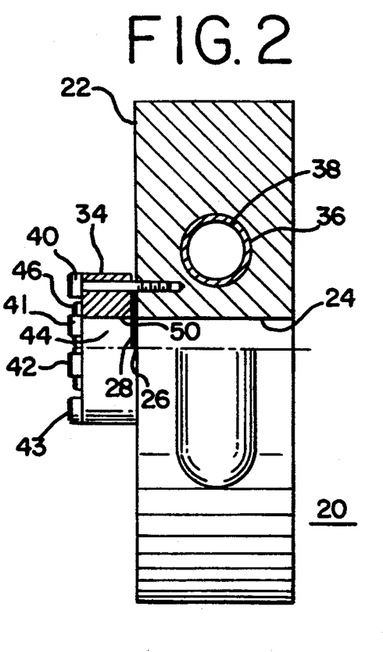
FIG. 2 is a partial cross sectional view of the monitor/detector assembly illustrated in FIG. 1.
Figure 3:
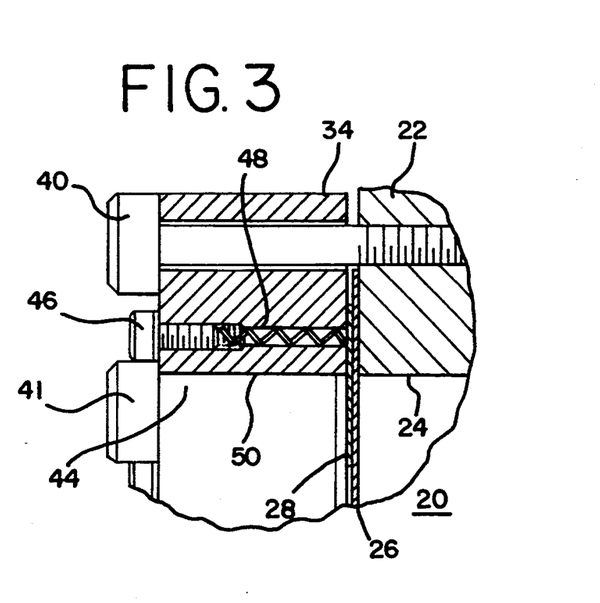
FIG. 3 is an enlarged view of the portion of the monitor/detector assembly of FIG. 2 enclosed in the circle shown by phantom lines.

Referring now more specifically to FIGS. 1-3, therein is disclosed a monitor/detector assembly for use in a synchrotron which produces x-ray beams having a high energy level hard core and a lower energy level halo or outer area, the monitor/detector assembly being generally designated by the reference numeral 20 and embodying the present invention. The monitor/detector assembly 20 includes a base flange 22 having a central opening 24. A window foil 26 is fused onto the base flange 22 and covers the opening 24. Sensor strips 28 and 30-33 are laid on the window foil 26. A contact plate 34 is secured to the base flange 22 and as a result, is clamped against the sensor strips 28 and 30-33.

In the case of the monitor/detector assembly 20, the window foil 26 is an uninterrupted foil that provides a vacuum barrier between the ring side or front end of the beamline in the synchrotron and the downstream segment of the beamline. On the other hand, the sensor strips 28 and 30-33 function as a photon beam position monitor so that the relative position of the photon beam being transmitted through the window foil 26 can be accurately determined. By using the monitor/detector assembly 20 in the beam path of the synchrotron, a single, integral unit inserted into the beam path not only provides the necessary separation of the front end of the beamline from the downstream segment, but also provides the necessary information as to the position of the beam as it is traveling in the synchrotron.

As indicated above, the base flange 22 is positioned in the path of the beam in the synchrotron. The flange 22 is formed of a highly conductive material, such as oxygen free copper, and includes the central opening 24 that is covered by the window foil 26. The flange 22 also includes cooling tube openings, such as the opening 36 (FIG. 2), so that a cooling tube 38 can project through the flange 22. Cooling water is circulated in the cooling tube 38 so as to dissipate heat that is generated by the beam as it is being transmitted through the monitor/detector assembly 20.

The window foil 26 that is fused to the base flange 22 functions as a vacuum barrier between the ring side or front end of the beamline of the x-ray beams that may be maintained at a superior vacuum level of $10^{-10}$ Torr and the downstream segment of the beamline that may be maintained at a lower quality vacuum level of $10^{-8}$ to $10^{-6}$ Torr. The window foil 26 also functions as a window that permits the transmission of the x-ray beams through it. In an APS type of device, insertion devices emit hard x-rays with large heat flux levels. Consequently, the window portion of the monitor/detector assembly 20 cannot be made of a material such as beryllium that traditionally has been used for such windows. Instead the window foil 26 is made of man-made materials, such as chemical vapor deposition diamond or cubic boron nitride, and typically is 50 to 100 $\mu$m thick. As can be appreciated, the window foil 26 needs to be strong enough to withstand the differential in pressure across the window foil 26 as well as to safeguard the ring side of the beamline from pressure shock waves that may occur as a result of beamline vacuum breach accidents on the downstream segment of the beamline.

The sensor strips 28 and 30–33 are laid on the window foil 26 in a manner similar to the circuits on a printed circuit board and are made of low atomic number materials, such as aluminum or beryllium. These sensor strips 28 and 30–33 are thin (for example, at least two microns) and about 50–1000 $\mu$m wide. The length of the sensor strips 28 and 30–33 is dependent on the beam size and in what spectral portion of the beam the sensor strips 28 and 30–33 are to operate. Typically, the sensor strips 28 and 30–33 are several millimeters in length.

Figure 13:
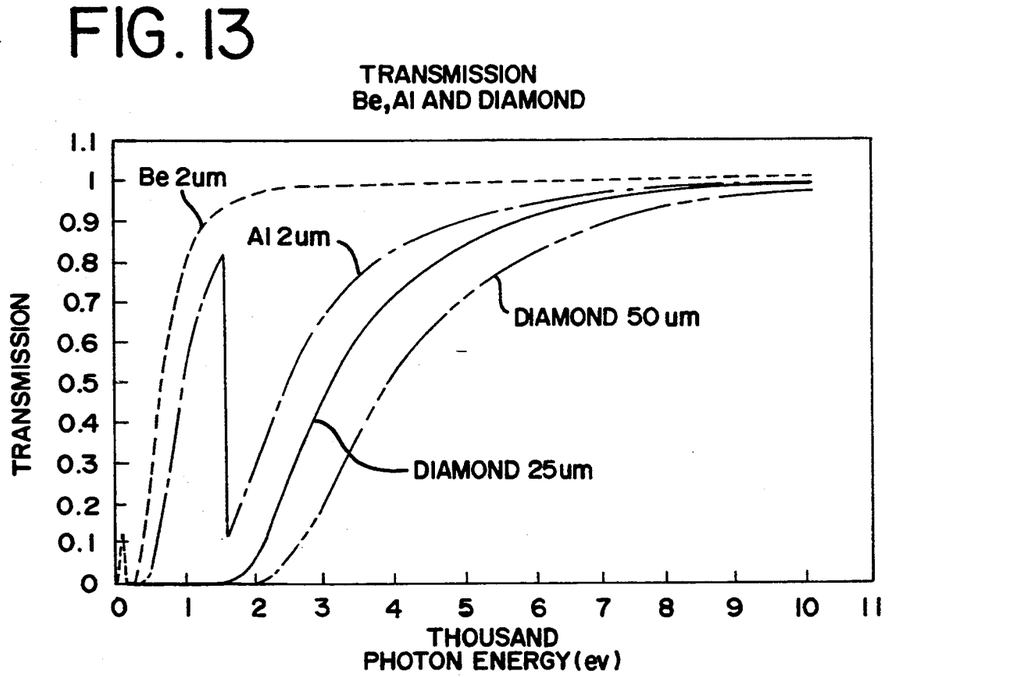
FIG. 13 is a graph showing the amount of photons that are transmitted through a barrier of beryllium, aluminum or diamond as a function of the photon energy level.

The low atomic number sensor strips 28 and 30–33 tend to absorb softer x-rays in the halo portion of the beam, but are virtually transparent to medium to high spectra photons found in the core of the beam. In this regard, FIG. 13 shows the x-ray transmission through diamond, beryllium, and aluminum for different thicknesses of those materials that might be used in the monitor/detector assembly 20. As shown in FIG. 13, several micron thick beryllium or aluminum will transmit x-rays in all energies to a greater extent than a window material of CVD diamond of 25–50 $\mu$m thick. Consequently, the sensor strips 28 and 30–33 do not interfere with the performance of the window-foil 26 either thermally or mechanically. Nevertheless, the low atomic number sensor strips 28 and 30–33 are sufficiently good photo-electron emitters that the sensor strips 28 and 30–33 generate a sufficient amount of electrons that can be measured and analyzed to determine the position of the beam in the synchrotron.

The contact plate 34 is formed of an insulating material, such as aluminum oxide; is positioned over the window foil 26; and is secured to the base flange 22 by clamping screws, such as the clamping screws 40–43 illustrated particularly in FIGS. 2 and 3. A central, oval opening 44 in the contact plate 34 defines the portion of the window foil 26 through which the x-ray beams are transmitted. When the contact plate 34 is so secured onto the base flange 22, the contact plate 34 is clamped against the sensor strips 28 and 30–33 along their outer portions. By securing the contact plate 34 to the base flange 22 (see in particular FIG. 2), the clamping forces that are produced are supported by the relatively thick base flange 22 so as to avoid placing any detrimental strains on the window foil 26.

The sensor strips 28 and 30–33 need to be coupled to external electronic signal processing devices (not shown). As is illustrated in FIGS. 2 and 3 in connection with the sensor strip 28, the sensor strips 28 and 30–33 are coupled to such external electronic signal processing devices via a copper signal post screw 46 and a copper spring 48. The copper spring 48 is inserted through the contact plate 34 so as to make electrical contact with the sensor strip 28. The signal post screw 46 is then secured in the contact plate 34 to thereby contact and compress the spring 48 against the sensor strip 28 to ensure proper contact with the sensor strip 28. The external electronic signal processing devices can be coupled to the signal post screw 46 and will thereby be coupled to the sensor strip 28. Instead of having the spring 48 coupling the signal post screw 46 to the sensor strip 28, a gold or silver lead can be printed on the contact plate 34 in such a manner that the lead would make contact with the sensor strip 28 when the contact plate 34 is clamped against the sensor strip 28. The signal post screw 46 would then make contact with that lead when the screw 46 is secured in the contact plate 34.

As previously indicated, the contact plate 34 is made of an insulator material. In order to insure that the contact plate 34 does not interfere with the x-ray beam being transmitted through the monitor/detector assembly 20, a bias coating 50 of copper, gold or silver is applied about the opening 44 in the contact plate 34 (see particularly FIGS. 2 and 3). The bias coating 50 is maintained at a predetermined potential so that the x-ray beam is not affected by the contact plate 34 as it is being transmitted through the opening 44.

Figure 4:
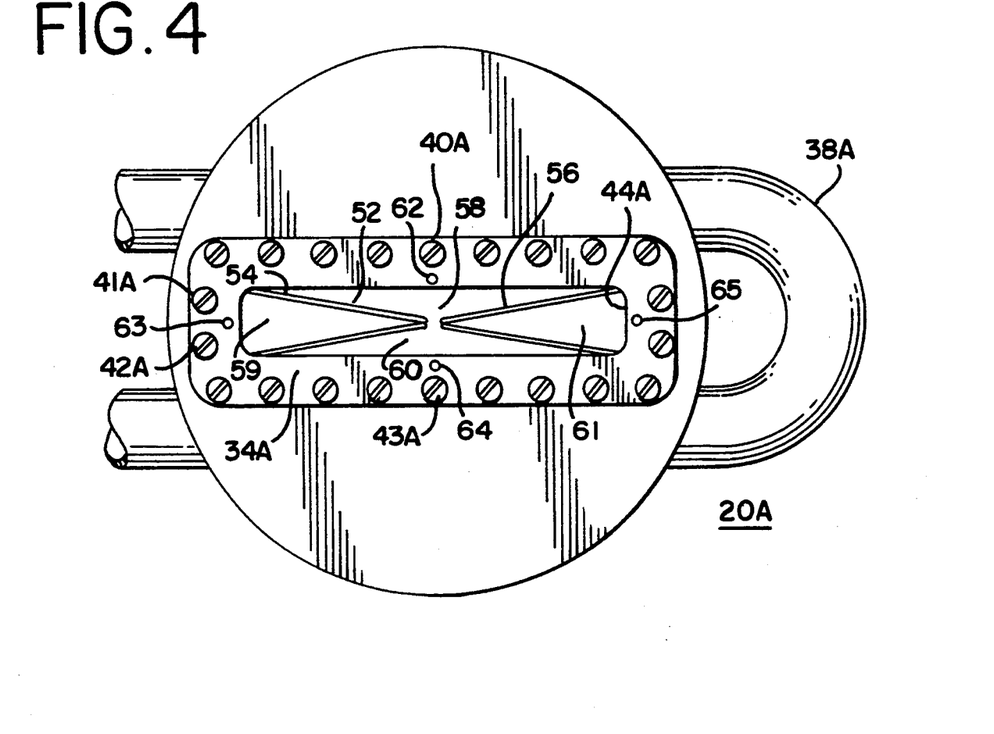
FIGS. 4, 5, 6, and 7 are simplified side elevational views similar to FIG. 1 illustrating different configurations of sensors used in the monitor/detector assembly of the present invention.

In FIGS. 1–3, the sensor strips 28 and 30–33 are configured so that the monitor/detector assembly 20 is a combined barrier window and photon beam position monitor because the sensor strips 28 and 30–33 provide data as to the vertical position (sensor strip 28) and the horizontal position (sensor strips 30–33) of the photon beam as it is being transmitted through the monitor/detector assembly 20 and the window foil 26 functions as a vacuum barrier. On the other hand, FIGS. 4–7 disclose respectively monitor/detector assemblies 20A, 20B, 20C and 20D with differently configured sensing means. The components of each of the monitor/detector assemblies 20A, 20B, 20C and 20D are referred to by the same reference numerals as corresponding components in the monitor/detector assembly 20 except for the addition of respectively the letter "A", "B", "C", or "D" following the reference numeral The monitor/detector assemblies 20A and 20B illustrated in FIGS. 4 and 5 having sensor strips or areas configured somewhat differently than in the monitor/detector assembly 20, but still function both as a barrier window and a photon beam position monitor. In FIG. 4, the entire exposed surface area of the window foil 26A is coated with a low atomic number sensing material 52, such as beryllium or aluminum. Diagonal strips 54 and 56 are formed where the sensing material 52 is removed so that wedged shaped sensing areas 58–61 are formed. As a result, the monitor/detector assembly 20A functions as an area photon beam position monitor in addition to a barrier window. The wedged shaped sensing areas 58–61 are particularly suited for measuring monochromatic x-ray beams because such areas 58–61 tend to provide higher precision and better averaging in the case of such beams. Nevertheless, the monitor/detector assembly 20A provides both horizontal and vertical beam position information. In the monitor/detector assembly 20A, the coupling of the sensing areas 58–61 to signal post screws 62–65 is accomplished in a manner similar to the coupling of the sensor strips 28 and 30–33 to signal post screws like the screw 46 in the monitor/detector assembly 20, but the screws 62–65 are respectively coupled to the sensing areas 58–61 instead of a particular sensor strip.

Figure 5:
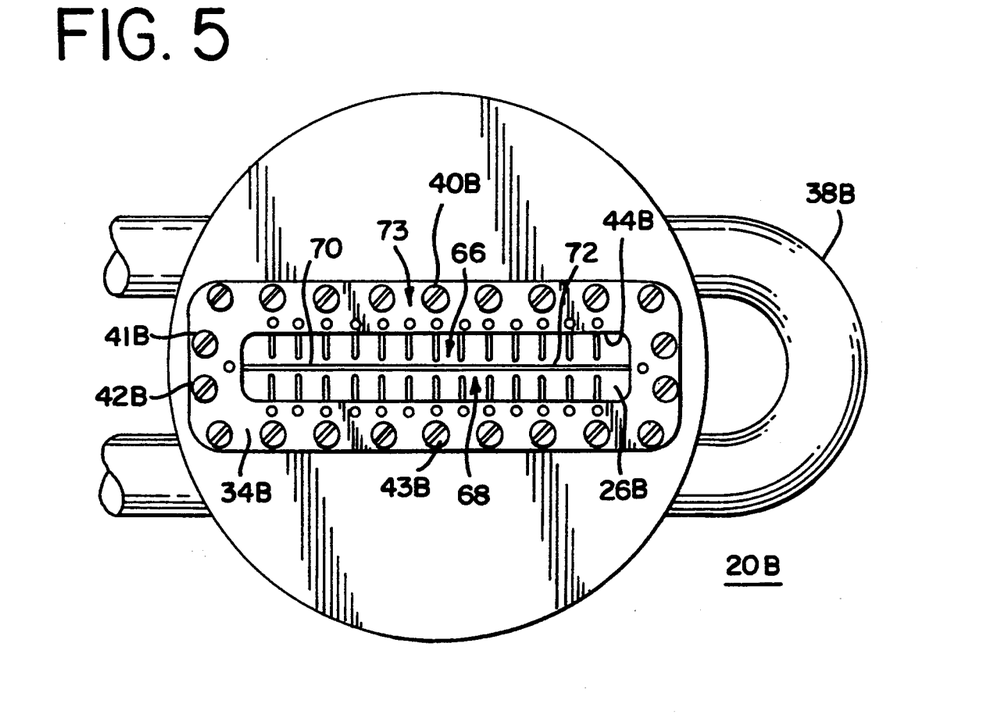

The monitor/detector assembly 20B illustrated in FIG. 5 also provides positioning information of the photon beam being transmitted through the monitor/detector assembly 20B. In the configuration of monitor/detector assembly 20B, a plurality of vertically oriented sensor strips 66 and 68 are laid on the window foil 26B on opposite sides of horizontal sensor strips 70 and 72. In the illustrated monitor/detector assembly 20B, thirteen sensor strips 66 and a corresponding thirteen sensor strips 68 are vertically position on opposite sides of the horizontally extending sensor strips 70 and 72. As was the case with the strips 28 and 30–33 in the monitor/detector assembly 20, the sensor strips 66, 68, 70 and 72 are made of low atomic number material, such as beryllium or aluminum, and each is coupled to one of a plurality of signal post screws 73 in the same manner as the sensor strips 28 and 30–33 were coupled to signal post screws like the screw 46 used in the monitor/detector assembly 20. Consequently, data from the sensor strips 66, 68, 70 and 72 can be supplied to external signal processing equipment. By having a plurality of vertical sensor strips 66 and 68, data on the actual spatial position of the beams being transmitted through the monitor/detector assembly 20B can be determined.

Figure 6:
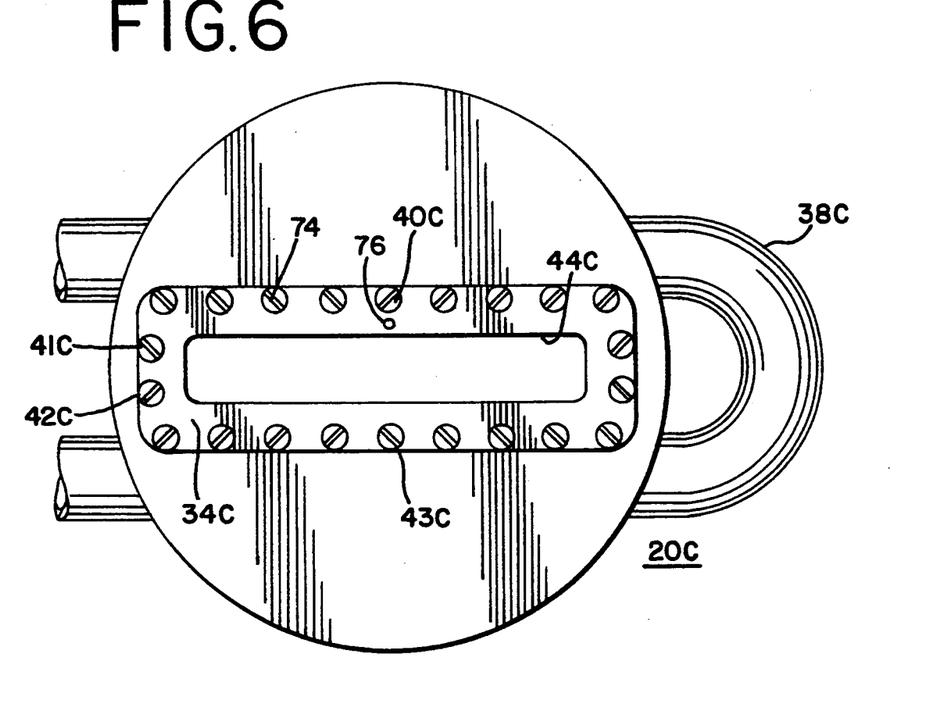

The monitor/detector assembly 20C illustrated in FIG. 6 is configured somewhat differently than the monitor/detector assemblies 20, 20A and 20B in that the entire window foil 26C is coated with sensing material 74. The sensing material 74 is a low atomic number material, such as beryllium or aluminum, and provides a signal to a signal post screw 76 that is indicative of the area-averaged beam flux of the beam as it is transmitted through the monitor/detector assembly 20C. This data can be compared to similar data acquired from another monitor/detector assembly 20C positioned at a different location along the beamline so that the monitor/detector assembly 20C can be considered a combined barrier window and total flux monitor or detector.

Figure 7:
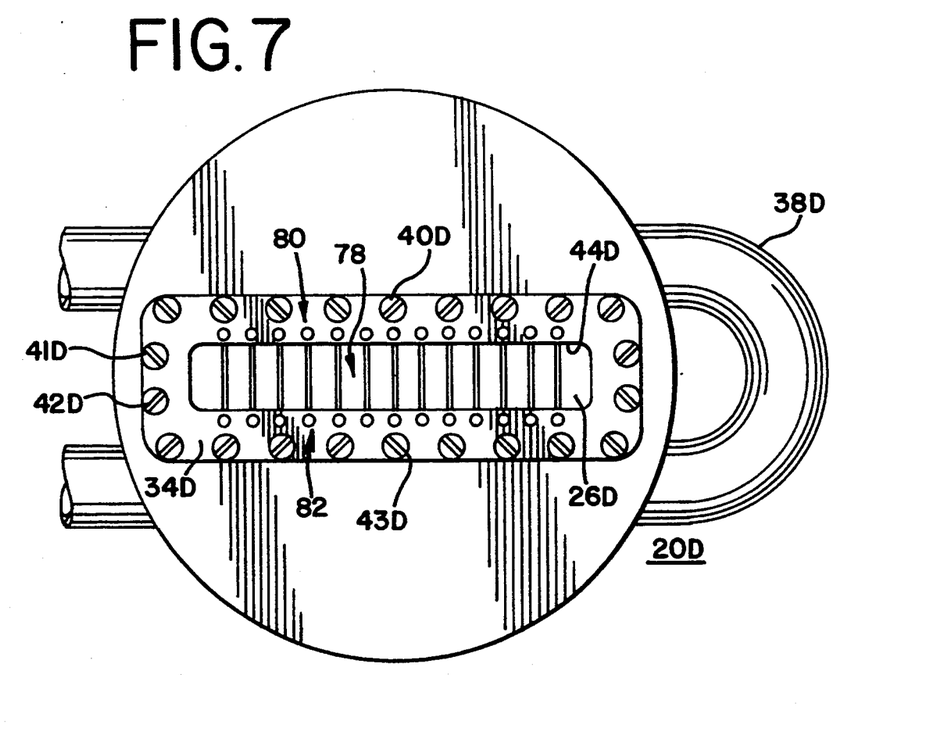

The monitor/detector assembly 20D illustrated in FIG. 7 functions as both a barrier window and a detector of filter failures. In the monitor/detector assembly 20D, a number of vertically oriented sensor strips 78 of low atomic number material, such as beryllium or aluminum, are disposed vertically on the window foil 26D. In the case of the monitor/detector assembly 20D, thirteen sensor strips 78 are utilized with each extending across the entire vertical length of the opening 44D and with each being coupled to one of the signal post screws 80 and one of the signal post screws 82. If a filter failure occurs along the beamline (for example, in the front end of the synchrotron), the differential signal from at least one of the sensor strips 78 will be indicative of this fact. In addition, changes in the thermal electric resistance of the sensor strips 78 can be used to detect inappropriate high temperature conditions that might be present along the beamline before the monitor/detector assembly 20D.

Figure 8:
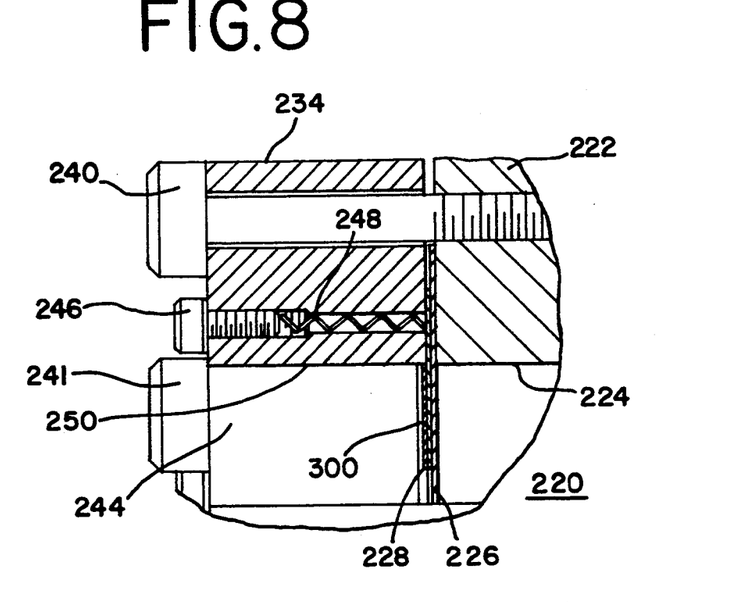
FIG. 8 is a enlarged view similar to FIG. 3 of a portion of alternate monitor/detector assembly embodying the present invention.

An alternate embodiment of a monitor/detector assembly embodying the present invention is disclosed in FIG. 8 and is generally designated by the reference numeral 220. The monitor/detector assembly 220 is essentially the same as the monitor/detector assembly 20 except for the addition of a front foil 300. Consequently, the components of the monitor/detector assembly 220 that are specifically referred to herein are referenced by the same reference numeral as corresponding components in the monitor/detector assembly 20 except that the quantity 200 has been added to the reference numerals for each of the corresponding components in the monitor/detector assembly 220. The monitor/detector assembly 220 includes a base flange 222 having a central opening 224. A window foil 226 is fused onto the base flange 222 and covers the opening 224. Sensor strips, such as the sensor strip 228, are laid on the window foil 226. A contact plate 234 is secured to the base flange 222 and as a result, is clamped against the sensor strip 228.

As was the case in connection with the monitor/detector assembly 20, the base flange 222 is positioned in the path of the beam in the synchrotron. The flange 222 is formed of a highly conductive material such as oxygen free copper and includes the central opening 224 that is covered by the window foil 226. While not shown in FIG. 8, the flange 222 also includes a cooling tube opening so that a cooling tube can project through the flange 222 for dissipation of heat generated in the monitor/detector assembly 220.

The window foil 226 that is fused to the base flange 222 functions as a vacuum barrier between the ring side or front end of the beamline of the x-ray beams and the downstream segment of the beamline. The window foil 226 is made of man-made materials, such as chemical vapor deposition diamond or cubic boron nitrate; typically is 50 to 100 μm thick; and also functions as a window that permits the transmission of the x-ray beams through it.

The sensor strip 228 is laid on the window foil 226 in a manner similar to the circuits on a printed circuit board and is made of low atomic number materials, such as aluminum or beryllium. The sensor strip 228 is thin (for example, at least two microns) and about 50–1000 μm wide. The length of the sensor strip 228 is dependent on the beam size and in what spectral portion of the beam the sensor strip 228 is to operate. Typically, the sensor strip 228 is several millimeters in length.

The contact plate 234 is formed of an insulating material, such as aluminum oxide; is positioned over the window foil 226; and is secured to the base flange 222 by clamping screws, such as the clamping screws 240–41. The contact plate 234 has a central opening 244 through which x-ray bears are transmitted. When the contact plate 234 is so secured onto the base flange 222, the contact plate 234 is clamped against the sensor strip 228 along its outer portion.

The sensor strip 228 needs to be coupled to external electronic signal processing devices (not shown). The sensor strip 228 is coupled to such external electronic signal processing devices via a copper signal post screw 246 and a copper spring 248. Instead of having the spring 248 coupling the signal post screw 246 to the sensor strip 228, a gold or silver lead can be printed on the contact plate 234 in such a manner that the lead would make contact with the sensor strip 228 when the contact plate 234 is clamped against the sensor strip 228. The signal post screw 246 would then make contact with that lead when the screw 246 is secured in the contact plate 234.

As previously indicated, the contact plate 234 is made of an insulator material. In order to insure that the contact plate 234 does not interfere with the x-ray beam being transmitted through the monitor/detector assembly 220, a bias coating 250 of copper, gold or silver is applied about the opening 244 in the contact plate 234. The bias coating 250 is maintained at a predetermined potential so that the x-ray beam is not affected as it is being transmitted through the opening 244 in the contact plate 234.

Unlike the monitor/detector assembly 20, the monitor/detector assembly 220 additionally includes the front foil 300 such that the sensor strip 228 is sandwiched between the front foil 300 and the window foil 226. The front foil 300 is made of a material similar to the window foil 226, such as CVD diamond or cubic boron nitrate; can be coated onto the window foil 226 by plasma spraying or chemical vapor deposition; and is typically a few microns thick. The purpose of the front foil 300 is to provide electric insulation and structural stability to the monitor/detector assembly 220. Moreover, the addition of the front foil 300 enables the measurement of the beam position to be based on selected photon energies above a predetermined absorption level., The thickness of the front foil 300 determines the spectral range of the photons absorbed. The higher energy photons will pass through the front foil 300 and impinge on the sensor strip 228 to thereby cause an emission from the sensor strip 228 to the signal screw 246. If the thickness of the front foil 300 is properly selected, only those photons which are allowed to pass through the front foil 300 will create such a signal in the sensor strip 228. As a result, the monitor/detector assembly 220 functions as a spectral beam position monitor as well as a barrier window.

Figure 11:
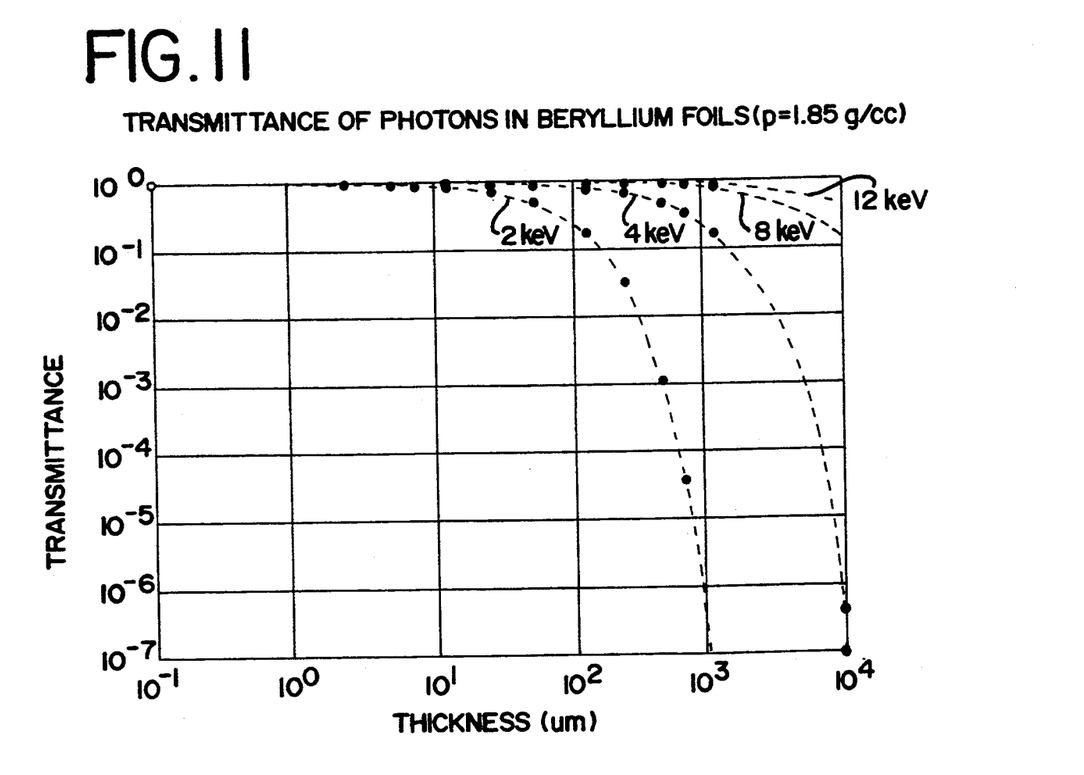
FIG. 11 is a graph showing the transmittance of photons of various energy levels through a beryllium foil as a function of the thickness of the foil.
Figure 12:
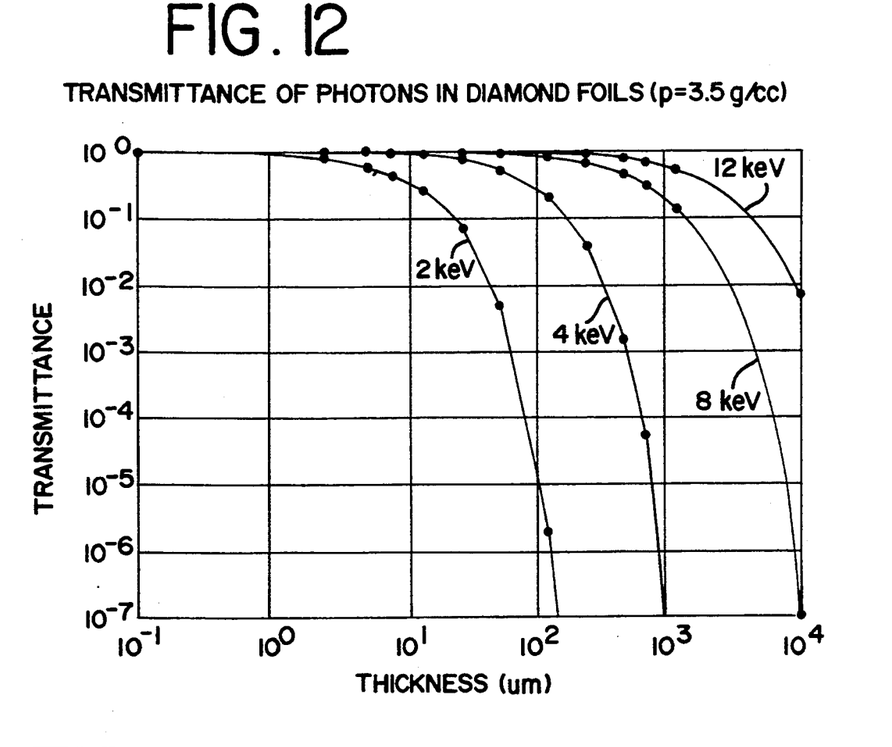
FIG. 12 is a graph showing the transmittance of photons of various energy levels through a diamond foil as a function of the thickness of the foil.

The choice of materials for the front foil 300 is another factor in determining what energy level photons will be allowed to pass through the front foil 300 and impinge on the sensor strip 228. For example, diamond tends to absorb photon energies in depth more than beryllium. In this regard, FIGS. 11 and 12 are graphs showing the spectral absorption of photons in beryllium and diamond foils for photon energies of 2 keV, 4 keV, 8 keV and 12 keV for foil thicknesses in the range of 10 $\mu$m to 10,000 $\mu$m. For most synchrotron applications that utilize photon energy in the range of 2–8 keV, the front foil 300 can be made of a diamond material with a thickness of 10 $\mu$m to 1000 $\mu$m. However, any desired x-ray photon energy can be selected to energize the sensor strip 228 by the selection of thickness of the front foil 300 and the material from which it is made.

Figure 9:
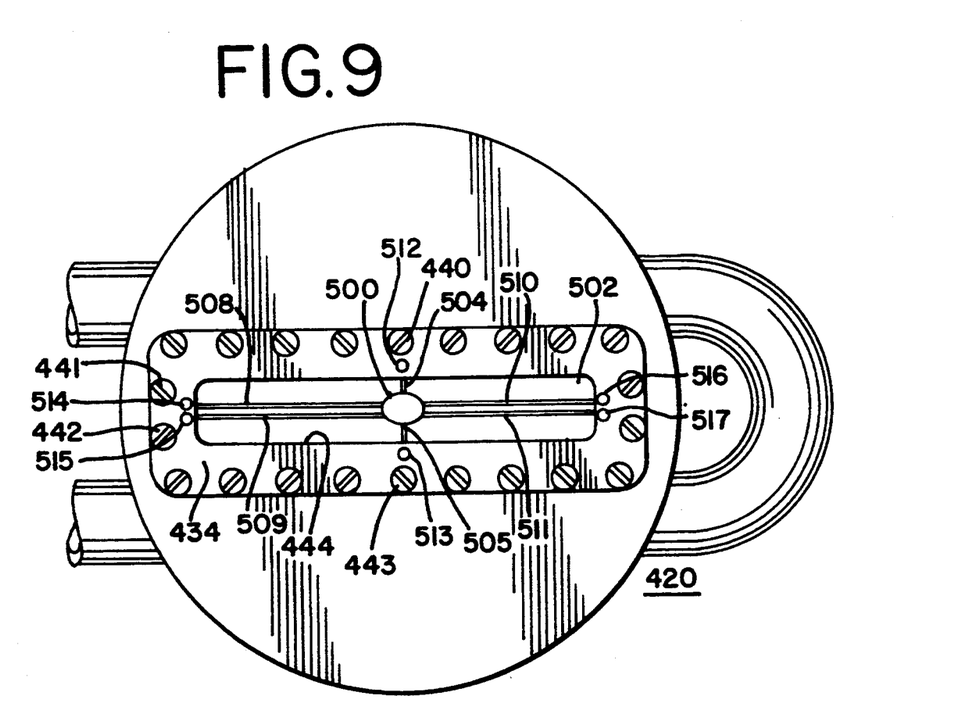
FIGS. 9 and 10 are simplified side elevational views similar to FIG. 1 illustrating different configurations of sensors used in the monitor/detector assembly of the present invention with the window foil having a central opening through which beams can be transmitted.

Another embodiment of a monitor/detector assembly embodying the present invention is disclosed in FIG. 9 and is generally designated by the reference numeral 420. The monitor/detector assembly 420 is similar to the monitor/detector assembly 20. Consequently, the components of the monitor/detector assembly 420 that are specifically referred to herein are referenced by the same reference numeral as corresponding components in the monitor/detector assembly 20 except that the quantity 400 has been added to the reference numerals for each of the corresponding components in the monitor/detector assembly 420. In the monitor/detector assembly 420, a central opening 500 is provided in a window foil 502 used in that assembly. The window foil 502 is fused onto a base flange like the flange 22 shown in FIGS. 2–3 which has a cooling tube 438 extending therethrough for cooling purposes. Vertically oriented sensor strips 504–505 and horizontally oriented sensor strips 508–511 are laid on the window foil 502. A contact plate 434 is secured to the base flange and as a result, is clamped against the sensor strips 504–505 and 508–511.

The window foil 502 is made of man-made materials, such as chemical vapor deposition diamond or cubic boron nitrate, and typically is 50 to 100 $\mu$m thick. Unlike the window foil 26, the window foil 502 includes the central opening 500 that is located at the center of a central opening 444 in the contact plate 434. In the case of the monitor/detector assembly 420, the central opening 500 is oval in shape, but the opening can be of other appropriate shapes such as circular or rectangular. The central opening 500 is positioned so that properly directed beams will be transmitted through the opening 500 and will not be affected in any way by the window foil 502.

The sensor strips 504–505 and 508–511 are laid on the window foil 502 in a manner similar to the circuits on a printed circuit board and are made of low atomic number materials, such as aluminum or beryllium. Each of the sensor strips 504–505 and 508–511 is thin (for example, at least two microns) and about 50–1000 $\mu$m wide. The length of the sensor strips 504–505 and 508–511 are dependent on the beam size and in what spectral portion of the beam the sensor strips 504–505 and 508–511 are to operate. Typically, each of the sensor strips 504–505 and 508–511 is several millimeters in length.

The contact plate 434 is formed of an insulating material, such as aluminum oxide; is positioned over the window foil 502; and is secured to the base flange by clamping screws, such as clamping screws 440–443. The contact plate 434 has the central opening 444 through which x-ray beams are transmitted. When the contact plate 434 is so secured onto the base flange, the contact plate 434 is Clamped against the sensor strips 504–505 and 508–511 along their outer portions.

The sensor strips 504–505 and 508–511 need to be coupled to external electronic signal processing devices (not shown). In the monitor/detector assembly 420, the coupling of the sensor strips 504–505 to signal post screws 512–513 and the coupling of the sensor strips 508–511 to signal post screws 514–517 respectively is accomplished in a manner similar to the coupling of the sensor strips 28 and 30–33 to signal post screws like the screw 46 in the monitor/detector assembly 20.

Figure 10:
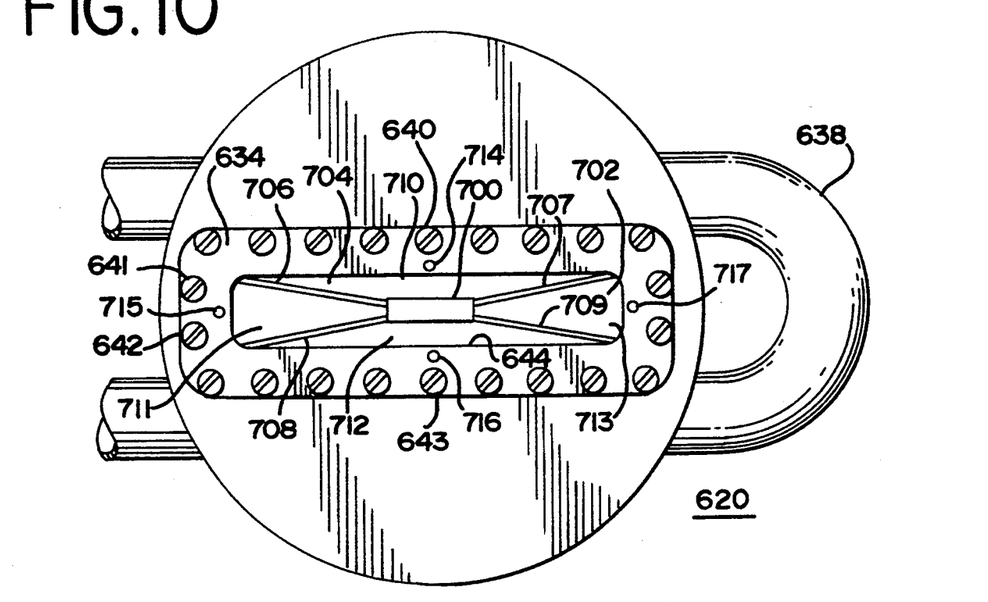

Another embodiment of a monitor/detector assembly embodying the present invention is disclosed in FIG. 10 and is generally designated by the reference numeral 620. The monitor/detector assembly 620 is similar to the monitor/detector assembly 20. Consequently, the components of the monitor/detector assembly 620 that are specifically referred to herein are referenced by the same reference numeral as corresponding components in the monitor/detector assembly 20 except that the quantity 600 has been added to the reference numerals for each of the corresponding components in the monitor/detector assembly 620. In the monitor/detector assembly 620, a central opening 700 is provided in a window foil 702 used in that assembly. The window foil 702 is fused onto a base flange like the flange 22 shown in FIGS. 2-3 which has a cooling tube 638 extending therethrough for cooling purposes. In the monitor/detector assembly 620, the entire exposed surface area of the window foil 702 is coated with a low atomic number sensing material 704, such as beryllium or aluminum. Diagonal strips 706–709 are formed where the sensing material is removed so that wedged shaped sensing areas 710–713 are formed. A contact plate 634 is secured to the base flange over the window foil 702 and the sensing areas 710–713.

The window foil 702 is made of man-made materials, such as chemical vapor deposition diamond or cubic boron nitrate, and typically is 50 to 100 $\mu$m thick. Similar to the window foil 502 in the monitor/detector assembly 420, the window foil 702 includes the central opening 700 that is located at the center of a central opening 644 in the contact plate 634. In the case of the monitor/detector assembly 620, the central opening 700 is rectangular in shape, but the opening can be of any other appropriate shape. The central opening 700 is positioned so that properly directed beams will be transmitted through the opening 700 and will not be affected in any way by the window foil 702.

The contact plate 634 is formed of an insulating material, such as aluminum oxide; is positioned over the window foil 702; and is secured to the base flange by clamping screws, such as clamping screws 640–643. The contact plate 634 has the central opening 644 through which x-ray beams are transmitted.

The sensing areas 710–713 need to be coupled to external electronic signal processing devices (not shown). In the monitor/detector assembly 620, the coupling of the sensing areas 710–713 to signal post screws 714–717 respectively is accomplished in a manner similar to the coupling of the sensor strips 28 and 30–33 to signal post screws like the screw 46 in the monitor/detector assembly 20. The basic difference is that the signal post screws 714–717 are coupled to the sensing areas 710–713 instead of sensor strips.

Obviously, many modifications and variations of the present invention are possible in light of the above teachings. Thus, it is to be understood that, within the scope of the appended claims, the invention may be practiced otherwise than as specifically described above.

What is claimed and desired to be secured by Letters Patent of the United States is:

1. A monitor/detector assembly for high energy photon beams traveling through first and second regions of a high energy device comprising:
   a base means to be positioned in the path of said beams between said first and second regions, said base means having an opening through which said beams are transmitted from said first region to said second region;
   a window means disposed over said opening, said window means permitting the transmission of said beams through said base means and providing a vacuum barrier between said first and second regions; and
   sensing means disposed on said window means for detecting said beams being transmitted through said base means.

2. A monitor/detector assembly as set forth in claim 1 wherein said sensing means is made of a low atomic number material.

3. A monitor/detector assembly as set forth in claim 1 wherein said window means is made of man-made materials.

4. A monitor/detector assembly as set forth in claim 3 wherein said window means is made of chemical vapor deposition diamond or cubic boron nitrate.

5. A monitor/detector assembly as set forth in claim 1 wherein said window means is a foil that is 50 to 100 $\mu$m thick.

6. A monitor/detector assembly as set forth in claim 1 wherein said sensing means is made of aluminum or beryllium.

7. A monitor/detector assembly as set forth in claim 1 wherein said sensing means are at least two sensor strips disposed on said window means orthogonally with respect to each other.

8. A monitor/detector assembly as set forth in claim 7 wherein each of said sensor strips are at least two microns thick and about 50–1000 $\mu$m wide.

9. A monitor/detector assembly as set forth in claim 1 wherein said sensing means are four wedged shaped areas on said window means.

10. A monitor/detector assembly as set forth in claim 1 wherein said sensing means is a sensing coating over the entire window means.

11. A monitor/detector assembly as set forth in claim 1 wherein said sensing means is a plurality of vertically oriented sensor strips disposed on said window means.

12. A monitor/detector assembly as set forth in claim 1 wherein said base means is electrically conductive.

13. A monitor/detector assembly as set forth in claim 12 wherein said base means is made of oxygen free copper.

14. A monitor/detector assembly as set forth in claim 1 wherein said base means has cooling means extending therethrough.

15. A monitor/detector assembly for high energy photon beams comprising:
   a base means to be positioned in the path of said beams, said base means having an opening through which said beams are transmitted;
   a window means disposed over said opening;
   sensing means disposed on said window means; and
   contact plate means secured to said base means and contacting said sensing means, said contact plate means having an opening corresponding to said opening in said base means.

16. A monitor/detector assembly as set forth in claim 15 wherein said contact plate means is made of aluminum oxide.

17. A monitor/detector assembly as set forth in claim 16 including a biasing coating on said contact plate means about said opening in said contact plate means.

18. A monitor/detector assembly as set forth in claim 17 wherein said biasing coating is formed of copper, gold or silver.

19. A monitor/detector assembly as set forth in claim 15 including signal coupling means disposed in said contact plate means and being coupled to said sensing means.

20. A monitor/detector assembly as set forth in claim 19 wherein said signal coupling means includes a screw post and a spring disposed in said contact plate means, said spring being coupled to said sensing means.

21. A monitor/detector assembly as set forth in claim 19 wherein said signal coupling means includes a screw post and conductive lead means on said contact plate means, said lead means being coupled to said sensing means when said contact plate means is secured to said base means.

22. A monitor/detector assembly for high energy photon beams comprising:
 a base means to be positioned in the path of said beams, said base means having an opening through which said beams are transmitted;
 a window means disposed over said opening;
 sensing means disposed on said window means; and
 front window means overlaying said sensing means such that said sensing means is disposed between said window means and said front window means.

23. A monitor/detector assembly as set forth in claim 1 wherein said front window means is made of chemical vapor deposition diamond or cubic boron nitrate.

* * * * *